United States Patent
Cohen et al.

(10) Patent No.: US 11,393,167 B2
(45) Date of Patent: Jul. 19, 2022

(54) VOLUME RENDERING OPTIMIZATION WITH KNOWN TRANSFER FUNCTION

(71) Applicant: Biosense Webster (Israel) Ltd., Yokneam (IL)

(72) Inventors: Benjamin Cohen, Haifa (IL); Lior Zar, Poria Illit (IL); Aharon Turgeman, Zichron Ya'acov (IL); Natan Sharon Katz, Atlit (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 50 days.

(21) Appl. No.: 16/236,964

(22) Filed: Dec. 31, 2018

(65) Prior Publication Data
US 2020/0211280 A1  Jul. 2, 2020

(51) Int. Cl.
*G06T 17/20* (2006.01)
*G06T 15/06* (2011.01)
*G06T 7/11* (2017.01)

(52) U.S. Cl.
CPC .............. *G06T 17/20* (2013.01); *G06T 7/11* (2017.01); *G06T 15/06* (2013.01)

(58) Field of Classification Search
CPC ....... G06T 17/20; G06T 17/205; G06T 15/04; G06T 15/10; G06T 15/00; G06T 11/40; G06T 15/005; G06T 15/08; G06T 17/00; G06T 19/00; G06T 15/40
See application file for complete search history.

(56) References Cited

U.S. PATENT DOCUMENTS

| | | | |
|---|---|---|---|
| 4,710,876 A | 12/1987 | Cline et al. | |
| 5,166,876 A | 11/1992 | Cline | |
| 6,002,738 A | 12/1999 | Cabral et al. | |
| 6,083,162 A | 7/2000 | Vining | |
| 6,990,228 B1* | 1/2006 | Wiles ...................... | G06T 17/10 345/419 |
| 9,265,434 B2 | 2/2016 | Merschon et al. | |
| 2004/0125103 A1 | 7/2004 | Kaufman et al. | |
| 2005/0149877 A1* | 7/2005 | Rice ...................... | A61B 5/0059 715/764 |
| 2009/0116709 A1 | 5/2009 | Sun et al. | |

(Continued)

FOREIGN PATENT DOCUMENTS

EP  204225 A2  12/1986

OTHER PUBLICATIONS

Dachille, Frank et al., "High-Quality Volume Rendering Using Texture Mapping Hardware", Siggraph/Eurographics Graphics Hardware Workshop, 1998, pp. 1-8.

(Continued)

*Primary Examiner* — Todd Buttram
(74) *Attorney, Agent, or Firm* — Dergosits & Noah LLP; Todd A. Noah

(57) ABSTRACT

Image processing is carried out by accepting an array of voxels that include data representing a physical property of a 3-dimensional object, segmenting the array of voxels into a plurality of regional subarrays of voxels that respectively satisfy predetermined criteria, transforming the subarrays into respective triangular meshes, the meshes having triangles that surround the subarrays and intercept the outer voxels of the subarrays, and rendering the triangular meshes on a display

14 Claims, 4 Drawing Sheets

(56) References Cited

U.S. PATENT DOCUMENTS

| | | | |
|---|---|---|---|
| 2011/0221865 A1* | 9/2011 | Hyndman | H04N 19/85 348/43 |
| 2012/0081357 A1* | 4/2012 | Habbecke | G06T 17/00 345/419 |
| 2012/0212496 A1* | 8/2012 | Kulla | G06T 15/06 345/501 |
| 2014/0267268 A1* | 9/2014 | Tipton | G06T 19/20 345/424 |
| 2019/0108639 A1* | 4/2019 | Tchapmi | G06N 5/04 |
| 2019/0278293 A1* | 9/2019 | Levinson | G05D 1/0274 |
| 2019/0325639 A1* | 10/2019 | White | G06T 1/20 |

OTHER PUBLICATIONS

European Search Report for corresponding EPA No. 19220196.0 dated Apr. 22, 2020.

* cited by examiner

- ⊗ Ray entry point
- ● Ray exit point
- ○ Ray marching point

VOLUME RENDERING OPTIMIZATION WITH KNOWN TRANSFER FUNCTION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to image data processing. More particularly, this invention relates to modeling and rendering of a 3-dimensional structure from image data.

2. Description of the Related Art

The meanings of certain acronyms and abbreviations used herein are given in Table 1.

TABLE 1

| Acronyms and Abbreviations | |
|---|---|
| CAT | Computed Axial Tomography |
| DICOM | Diagnostic Imaging and Communications in Medicine |
| ECT | Emission Computed Tomography |
| GPU | Graphics Processing Unit |
| HLSL | High-Level Shading Language |
| MMI | Multimodality Imaging |
| NMR | Nuclear Magnetic Resonance |

3-dimensional arrays of data representing one or more physical properties at regular grid positions within the interior of solid bodies can be obtained by non-intrusive methods such as computed axial tomographic (CAT) x-ray scanning systems, by nuclear magnetic resonance (NMR) imaging systems, or by other non-intrusive mechanisms such as ultrasound, positron emission tomography (PET), emission computed tomography (ECT) and multimodality imaging (MMI). Each of these techniques produces a planar, grid-like array of values for each of a succession of slices of the solid object, thus providing a 3-dimensional array of such values. Typically, the solid object is a human body or a portion thereof, although the method is equally applicable to other natural or artificial bodies. In the case of CAT scanning, the physical value would be the coefficient of x-ray absorption. For NMR imaging, the physical value would be the spin-spin or the spin-lattice relaxation time. In any event, the measured physical values reflect the variations in composition, density or surface characteristics of the underlying physical structures. Such a 3-dimensional data array typically consists of a plurality of sets of 3-dimensional (x,y,z) coordinates distributed at regular positions in a cubic or parallelepiped lattice within the body, and at least one value (Vxyz) of the physical property being associated with each respective one of the coordinate positions. Each cubically adjacent set of eight such positions defines a cubic volume called a "voxel" with a physical property value being specified for each of the eight voxel vertices. In turn, each voxel "neighborhood" includes the voxel itself and the immediately adjacent six voxels that share a common face; thus, a voxel neighborhood is a cubic volume including seven voxels having 32 physical values associated with the voxel vertices.

DICOM files, for example from an MRI or a CT scan, comprise a large amount of data in the form of 3D voxels, each voxel having a value, such as a Hounsfield unit value in the case of a CT scan. Typically the data is generated as slices, and it may be presented on a screen as slices. But to convert the data so that it can be more clearly seen requires the data to be segmented, so that, for example, voxels of bone are distinguishable from voxels of skin. The segmented data is then rendered as a volume. Even when this is done, because of the large amount of data involved, any manipulation, such as rotating an image of a bone (that has been rendered as a volume) so that it can be seen from different angles, is time consuming even for modern fast computers.

U.S. Pat. No. 4,710,876 to Cline et al., which is herein incorporated by reference, describes the generation of coordinate values representing polygonal and, in particular, triangular surfaces. These polygonal surfaces approximate the intersection of the desired surface with a 3-dimensional volume element, such as a voxel. The eight values defined at the eight vertices of a three dimensional grid structure are employed to generate an eight bit vector. This vector is employed as an address to rapidly generate the coordinate values. In each voxel element (defined by the eight cubically adjacent grid points), the object is to define a surface, which separates included from excluded vertices. The technique described in U.S. Pat. No. 4,710,876 is known as the "marching cubes" method.

Segmentation of medical images has been proposed for distinguishing multiple organs as a strategy for performing further searches to identify suspicions lesions. For example, U.S. Patent Application Publication No. 2009/0116709 by Hui Sun et al., describes segmenting image data by creating a plurality of marching regions within the medical image data. Region-wise segmentation is performed on the plurality of marching regions. Voxel-wise segmentation may be performed on a subset of the plurality of marching regions. The determination as to which voxels or pixels are similar may be calculated from the fast marching algorithm.

SUMMARY OF THE INVENTION

Embodiments of the invention use a number of steps to reduce the time involved in viewing a file from any selected direction. The time reduction relies on the fact that a graphic processing unit (GPU) is extremely fast in manipulating data when the data is in the form of triangles. A mesh of triangles is generated from voxels of a DICOM file. Parallel rays are generated form the voxels and coded according to their origin. For example, voxels representing bone tissue may be coded as 1 and non-bone voxels coded 0. A ray intersecting the mesh may result in a pixel color assigned to bone tissue according to a physical property of the tissue, such as X-ray absorbance. Similarly, codes and color are assigned to other tissues of the image. The color of each pixel is a composite of all the colors relating to one or more rays striking the pixel in the mesh.

In manipulating the image of objects in the file, the GPU is required to only act on triangles of the mesh, not on voxels. This results in a speedup of up to 400% in the rendering and rotation of objects.

There is provided according to embodiments of the invention a method of image processing, which is carried out by accepting an array of voxels that include data representing a physical property of a 3-dimensional object, segmenting the array of voxels into a plurality of regional subarrays of voxels that respectively satisfy predetermined criteria, transforming the subarrays into respective triangular meshes, the meshes having triangles that surround the subarrays and intercept the outer voxels of the subarrays, and rendering the triangular meshes on a display in a sequence of rotational views.

According to one aspect of the method, segmenting the array of voxels is performed by ray marching.

According to a further aspect of the method, transforming the subarrays is performed by executing a marching cubes algorithm on the subarrays.

According to yet another aspect of the method, constructing triangular meshes is performed by executing a ball pivoting algorithm.

According to still another aspect of the method, transforming the subarrays is performed by executing a Delaunay triangulation algorithm.

According to an additional aspect of the method, rendering the triangular meshes includes assigning respective optical characteristics to the subarrays and rendering a composite of the optical characteristics on the display.

According to another aspect of the method, the optical characteristics are pseudocolors.

There is further provided according to embodiments of the invention an image-processing apparatus, including a processor, a display, a data input interface, a graphics processing unit, a memory accessible to the processor that stores program modules and data objects, wherein execution of the program modules cause the processor to perform the steps of: accepting an array of voxels that include data representing a physical property of a 3-dimensional object, segmenting the array of voxels into a plurality of regional subarrays of voxels that respectively satisfy predetermined criteria, transforming the subarrays into respective triangular meshes. The meshes comprise triangles that surround the subarrays and intercept the outer voxels of the subarrays, and with the graphics processing unit rendering the triangular meshes on a display in a sequence of rotational views.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily needed for practicing the present invention. In this instance, well-known circuits, control logic, and the details of computer program instructions for conventional algorithms and processes have not been shown in detail in order not to obscure the general concepts unnecessarily.

First Embodiment

Figure 1:
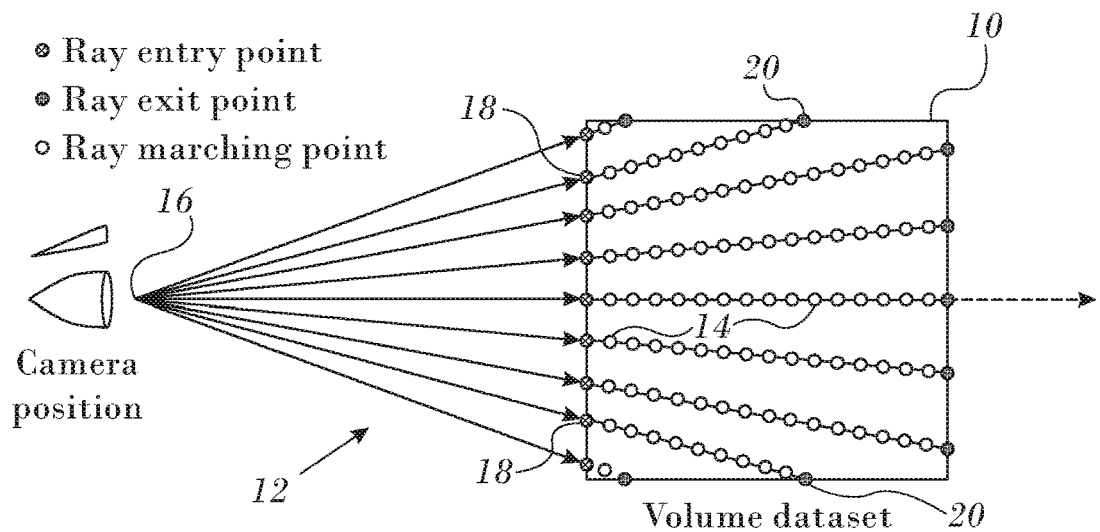
FIG. 1 is a diagram illustrating a ray marching algorithm in accordance with an embodiment of the invention.

To facilitate understanding of the principles of the invention, a representation is shown of a volume 10 of voxels in FIG. 1. A procedure known as "ray marching" or "ray casting" is performed. Rays 12, also known as "rays of sight", are generated so as to pass through the volume 10 and intersect some of the voxels therein at marching points (some of which are indicated representatively as marching points 14). In this example the rays 12 converge on a viewing position 16, such as a camera. Entry points 18 and exit points 20 of the rays 12 passing through the volume 10 are shown.

Figure 2:
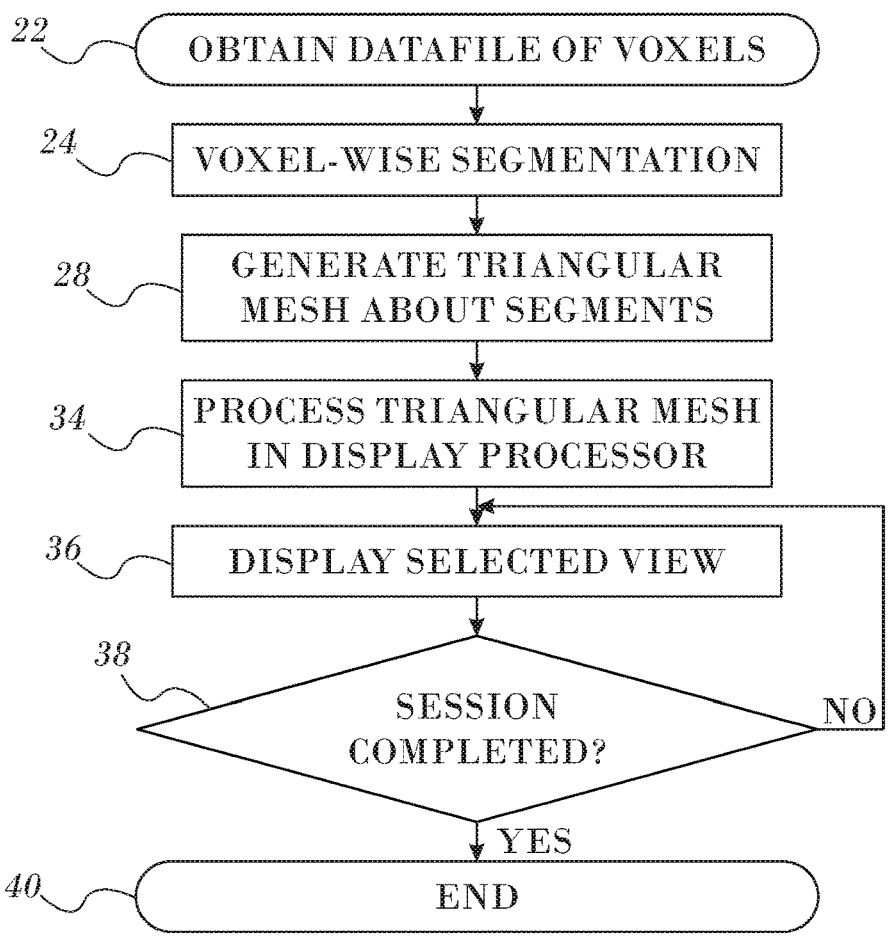
FIG. 2 is a flow chart of a method of operating a GPU or other display processor, in accordance with an embodiment of the invention.
Figure 3:
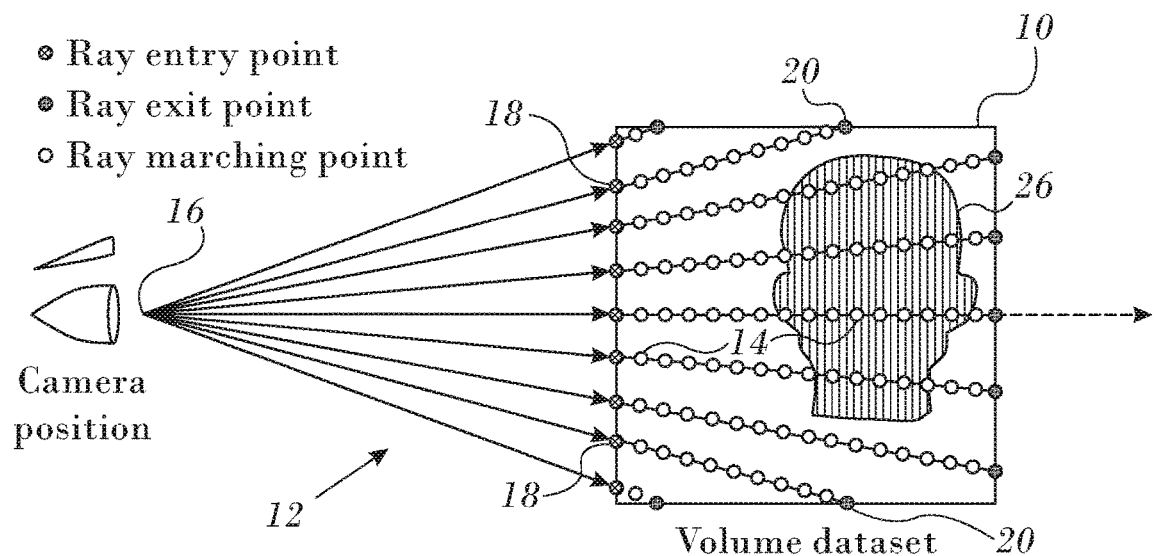
FIG. 3 is a diagram similar to FIG. 1 illustrating segmentation of an array of voxels in accordance with an embodiment of the invention.

Reference is now made to FIG. 2, which is a flow chart of a method for image processing in accordance with an embodiment of the invention. In the discussion that follows, it is assumed that images have been acquired, typically from a medical procedure. Data files of image data in the form of voxels are presented for processing in initial step 22. Voxels at marching points 14 are respectively evaluated, using the above-described ray marching procedure to determine if a transfer function of the data in the voxels satisfies predetermined criteria. In one example, voxels having function values within a given range of Hounsfield units might be considered to represent bone tissue. In step 24 the ray marching procedure described above (FIG. 1) is employed to segment the volume 10. As shown in FIG. 3, which is a diagram similar FIG. 1, a sub-volume 26, is identified by step 24, i.e., a subarray of voxels that satisfy a particular criterion. Voxels that are not included in the subvolume 26 do not satisfy the criterion. More than one segment of interest may be identified on a typical medical image according to different criteria, and may correspond to different types of body tissues.

Alternatively. the methods described in U.S. Patent Application Publication No. 2009/0116709 by Sun et al., which is herein incorporated by reference, may be applied to identify the sub-volume 26.

Figure 4:
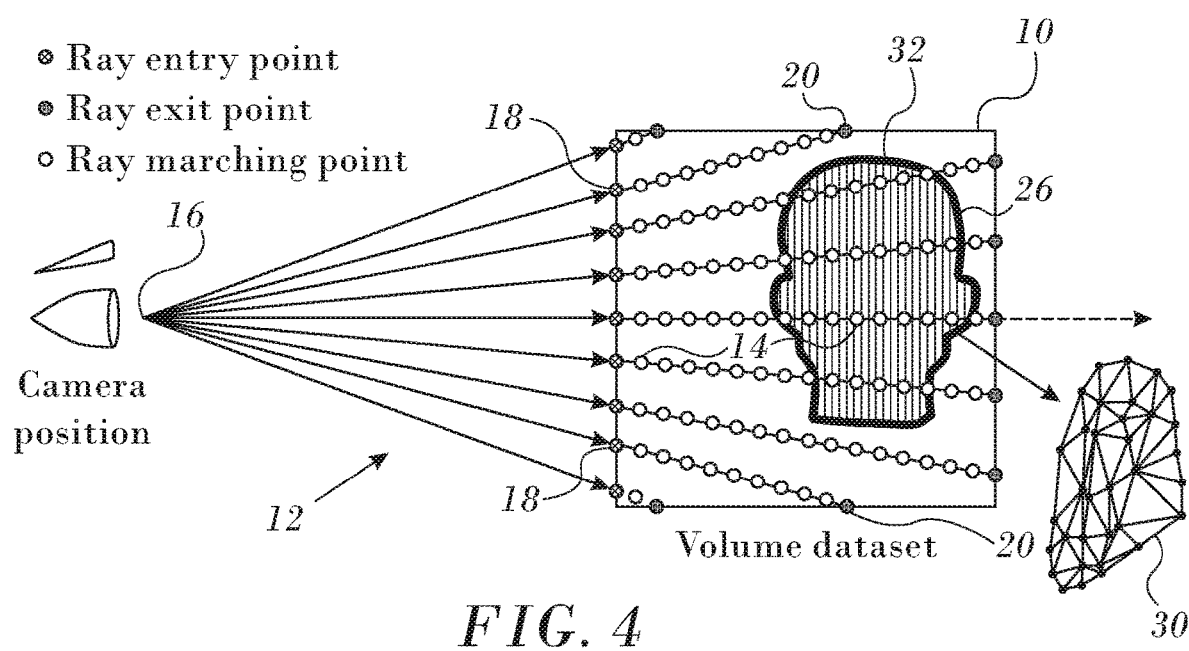
FIG. 4 is a diagram similar to FIG. 3 illustrating a triangular mesh about a segment of voxels in accordance with an embodiment of the invention.

In step 28 the structures corresponding to the sub-volumes are modeled by constructing a surrounding triangular mesh on the surface of each segment of interest that was defined in step 24. In other words, the triangles of the mesh intercept the outer voxels of the sub-volumes that comprise the segments of interest. FIG. 4 is a diagram similar to FIG. 3, with the addition of triangular mesh 30 about the sub-volume 26. The triangular mesh 30 is indicated by a thick line 32.

One method of generating the triangular mesh 30 is the marching cubes algorithm, which is described in the above-noted U.S. Pat. No. 4,710,876. In embodiments of the invention implementing the marching cubes algorithm, the procedure examines or "marches" over the voxels in the entire sub-volume 26 to determine if a triangular surface of the mesh passes through individual voxels or not. Briefly, for any voxel, if the cubically adjacent voxels (voxels touching its eight vertices) are all inside the sub-volume 26 or all outside the sub-volume 26, then no triangular surface passes through that voxel. However, if some of the cubically adjacent voxels are inside the sub-volume 26 and others are outside, then intersections with the given voxel exist, i.e., the given voxel is partially inside and partially outside the sub-volume 26. The intersections define triangles of the mesh. There are 256 cases of surface intersection arrangements, but, based on symmetries and complementation, only 14 cases actually need to be dealt with.

Figure 5:
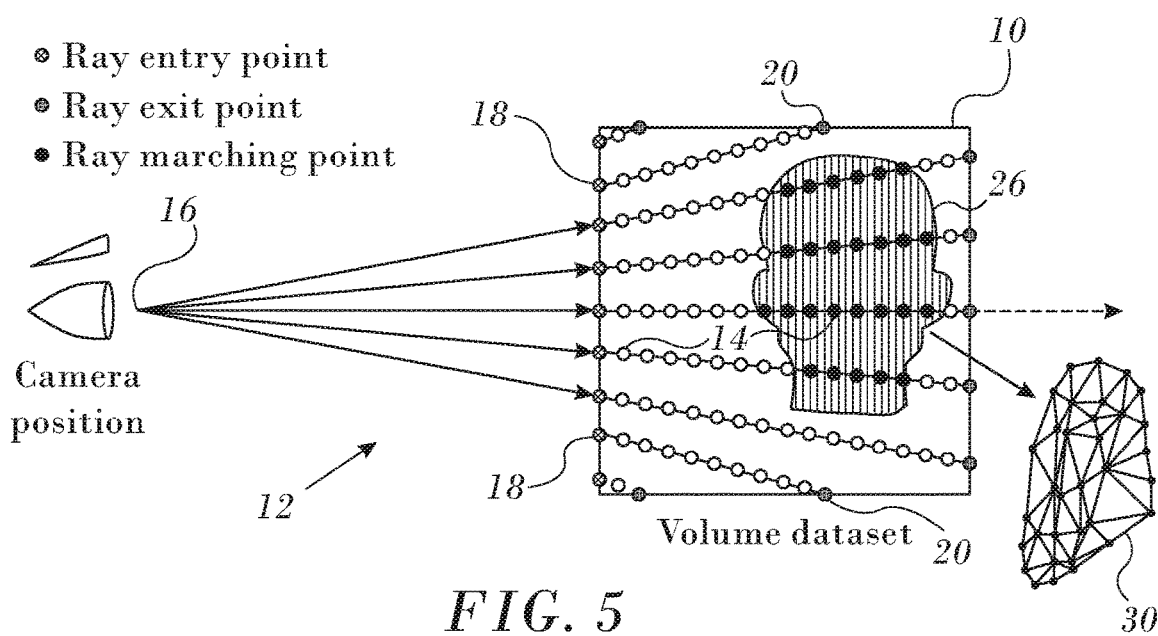
FIG. 5 is a diagram similar to FIG. 4 illustrating voxels from which the triangular mesh is derived.

As shown in FIG. 5, the triangular mesh 30 is formed by intersections of triangles with voxels corresponding to marching points represented by solid black circles, which are a subset of the marching points 14 in the volume 10.

Referring again to FIG. 2, in step 34 the triangular mesh 30 is processed by a display processor, such as a GPU. View selection and other image processing operations are performed by the display processor on the triangular mesh 30.

A session typically involves iteratively selecting a view to display, usually by an operator such as a physician. For example, a viewer inputs to the display processor a rotation instruction for a tissue of interest. The display processor rotates the mesh accordingly. If the viewer is looking at a screen of pixels, the display processor assumes parallel rays are directed from each pixel towards the mesh. If a ray hits the mesh, its pixel is colored according to a user-chosen color for the tissue of interest. If there is no hit, the pixel is not colored. The selected view is displayed in step 36. The inventors have found that the speed of graphics manipulation using the triangular mesh 30 is 400% faster than rendering the voxels in the segments of the volume 10.

Next, at decision step 38, it is determined if the viewing session is complete. If the determination at decision step 38 is negative, then control returns to step 36 for selection of another view which may be a different rotational view than its predecessor.

If the determination at decision step 38 is affirmative, then the procedure ends at final step 40.

Second Embodiment

Figure 6:
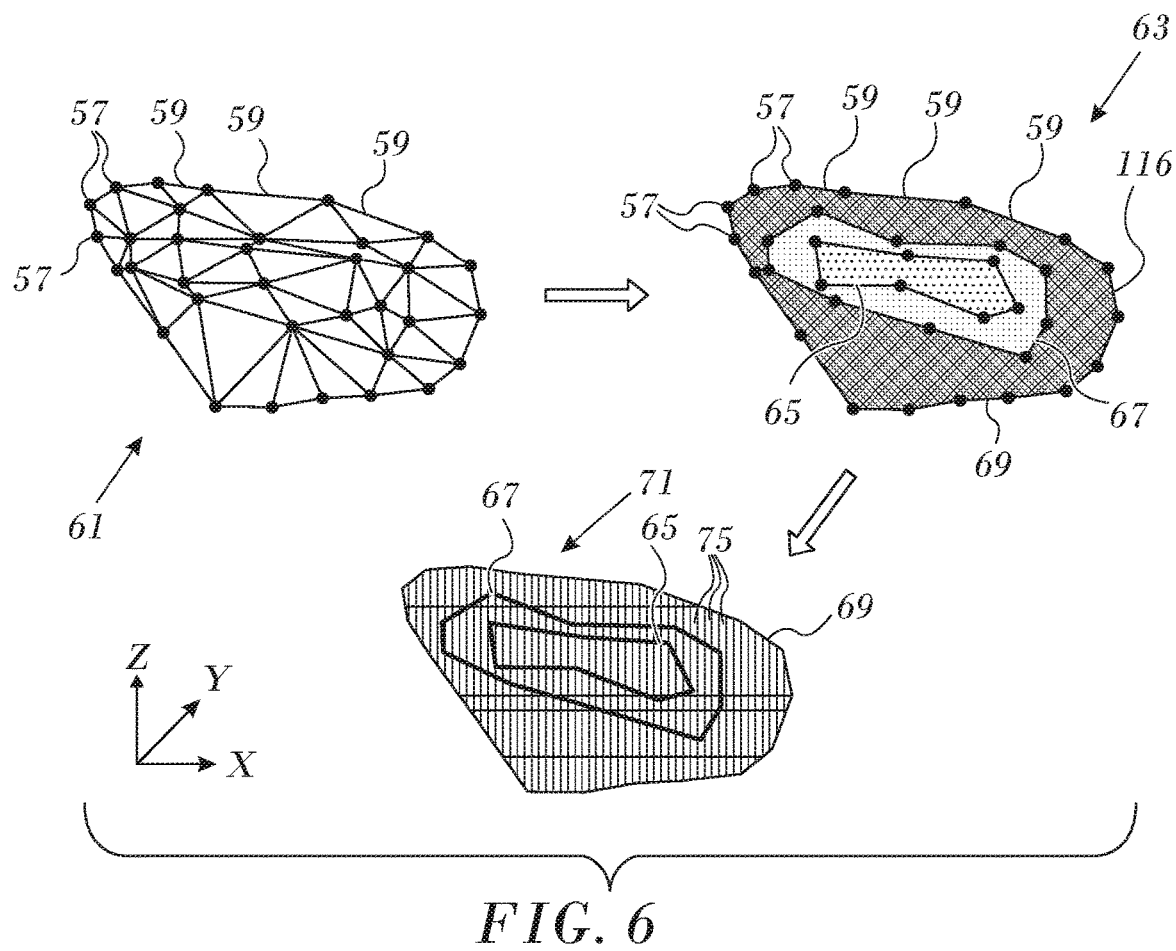
FIG. 6 is a series of diagrams illustrating stages in a volume reconstruction from a point cloud, in accordance with an embodiment of the invention.

In alternate embodiments other methods of constructing the triangular mesh from the marching points 14 within the sub-volume 26 (FIG. 2), which can be treated as a point cloud. Reference is now made to FIG. 6, which is a series of diagrams illustrating stages in a volume reconstruction from a point cloud, in accordance with an embodiment of the invention. A processor uses a mapping module to initially connect locations 57 of the point cloud, to define a mesh 61 of line segments 59.

The mesh 61 typically, although not necessarily, is a triangular mesh. In one embodiment, the processor uses the Ball-Pivoting Algorithm (BPA) to produce the mesh 61. Typically, if the BPA is used, a size of the ball is set to correspond to the size of the voxels referred to above. Alternatively, the mesh 61 may be generated as a Delaunay triangulation, comprising a plurality of triangles having vertices corresponding to the locations 57. The triangles of the triangulation may be based on Voronoi diagrams formed about the locations 57. However, the processor may use any convenient method that is known in the art for forming a mesh.

Display Processing.

Displaying the triangular mesh 30 begins in step 34 (FIG. 2). Details of one method of accomplishing step 34 follow. After producing the mesh 61, the processor generates a generally smooth surface 63 connecting locations 57 and line segments 59. To generate the surface 63, the processor typically uses interpolation and, additionally or alternatively, extrapolation. In addition, to ensure that the surface 63 is generally smooth, the processor may adjust the surface to be close to, but not necessarily include, some of the locations 57 and line segments 59. By way of example, the surface 63 has contours 65, 67, 69.

Then, after generating surface 63, the processor checks if the surface is closed, i.e., if the surface is topologically equivalent to a closed surface such as a sphere. Typically, surface 63 is not closed, having one or more openings. The openings in a surface may represent structures that naturally occur in the organ, such as the superior vena cava, or the inferior vena cava of the right atrium. Such openings are referred to as natural openings. Additionally, there may be openings in surface 63, herein referred to as artificial openings, because the organ has not been fully mapped.

In the event that surface 63 is not closed, the processor may close the surface by adding further surface elements until the surface is closed to produce a closed surface 71. In one embodiment, an opening is closed by adding an oriented bounding box that surrounds the opening, the box having a minimal volume. The box is then treated as part of the surface.

Further details of the operation of a display processor are disclosed in commonly assigned U.S. Pat. No. 9,265,434 entitled Dynamic Feature Rich Anatomical Reconstruction from a Point Cloud, which is herein incorporated by reference.

Composite Imaging.

In practice, there can be numerous triangular meshes, derived from different sub-volumes of voxels, representing different types of tissue on an image.

For example there may be a skin mesh and a bone mesh. Each parallel ray may hit nothing, skin and/or bone. The voxels of the sub-volumes are assigned respective optical indicia, such as pseudocolors, shading, and patterns. Pseudocolors are described in the following discussion by way of example.

Figure 7:
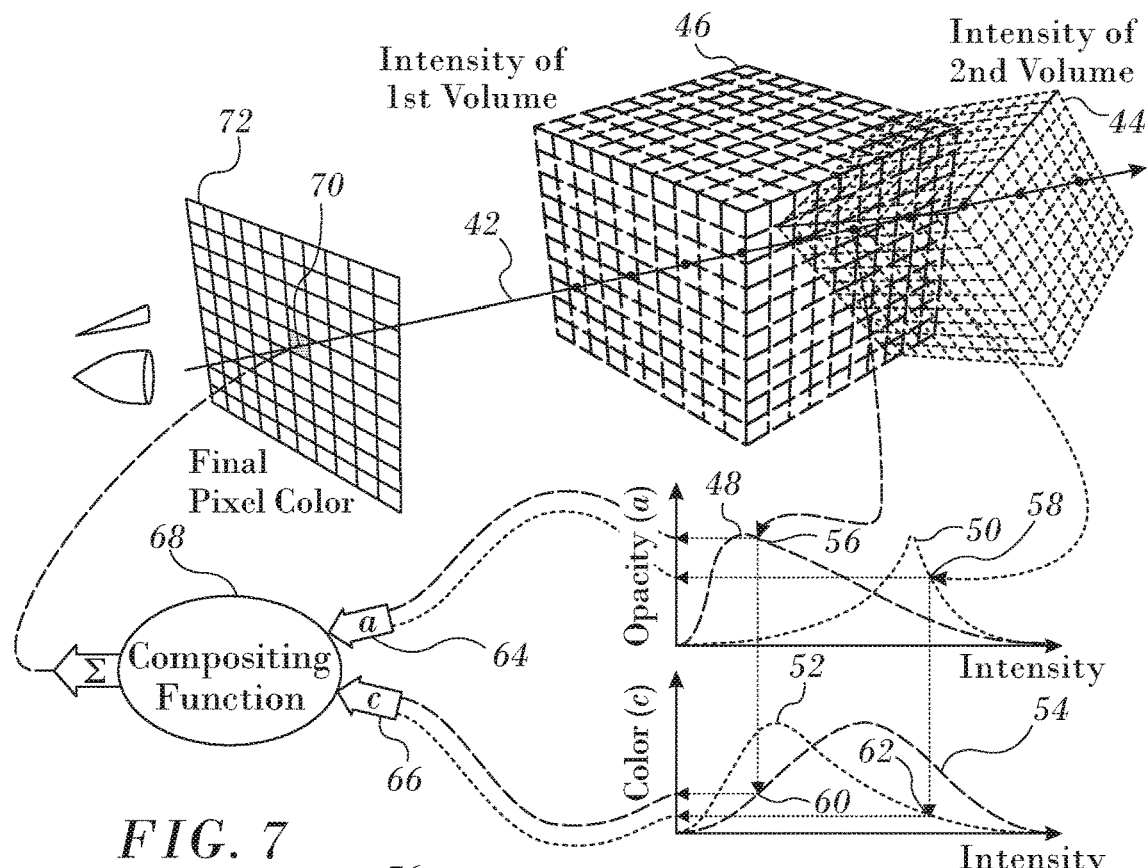
FIG. 7 is a composite schematic diagram illustrating graphics processing of multiple meshes in accordance with an embodiment of the invention.

The color of each pixel is a composite of all the pseudocolors hit by the ray of the pixel, taking account of any transparency assigned to the meshes. A scheme for graphics processing of multiple meshes in accordance with an embodiment of the invention is shown in FIG. 7. Volume rendering using graphics hardware of the sort illustrated in FIG. 7 is well known in the art. A capsule description of the relevant techniques is provided in Sections 4-10 of the Internet document: *Volume Rendering using Graphics Hardware,* Travis Gorkin, June 2009, which is herein incorporated by reference. After completing the segmentation of an image file (step 28 in FIG. 1), and considering only the segments, a sight ray 42 passing through a volume may pass through voxels from more than one segment, such as first and second sub-volumes 44 46 in FIG. 6. In each sub-volume the calculated intensity of the rays is a function of the optical opacity in the original image based on physical characteristic encoded in the voxels and the number of voxels intercepting the ray. Consequently the sub-volumes 44 46 produces respective characteristic intensity curves 48, 50. Similarly, based on pseudocolors assigned to the tissues represented by the sub-volumes 44 46, color intensity curves 52, 54 may also be generated. Values from the respective points 56, 58 on curves 48, 50 and points 60, 62 from curves 52, 54 are submitted as input pairs 64, 66 to a compositing function 68 whose pixel output 70 is displayed as a composite color on a display screen 72. Alternatively, the apparatus described in the above noted U.S. Pat. No. 4,710,876 (col. 16, line 5 through col. 17, line 25, together with FIGS. 8 and 9) may be employed, mutatis mutandis, to perform the compositing function 68.

The scheme shown in FIG. 7 may be implemented by those skilled in the art using the HLSL code fragment of Listing 1.

Apparatus.

Figure 8:
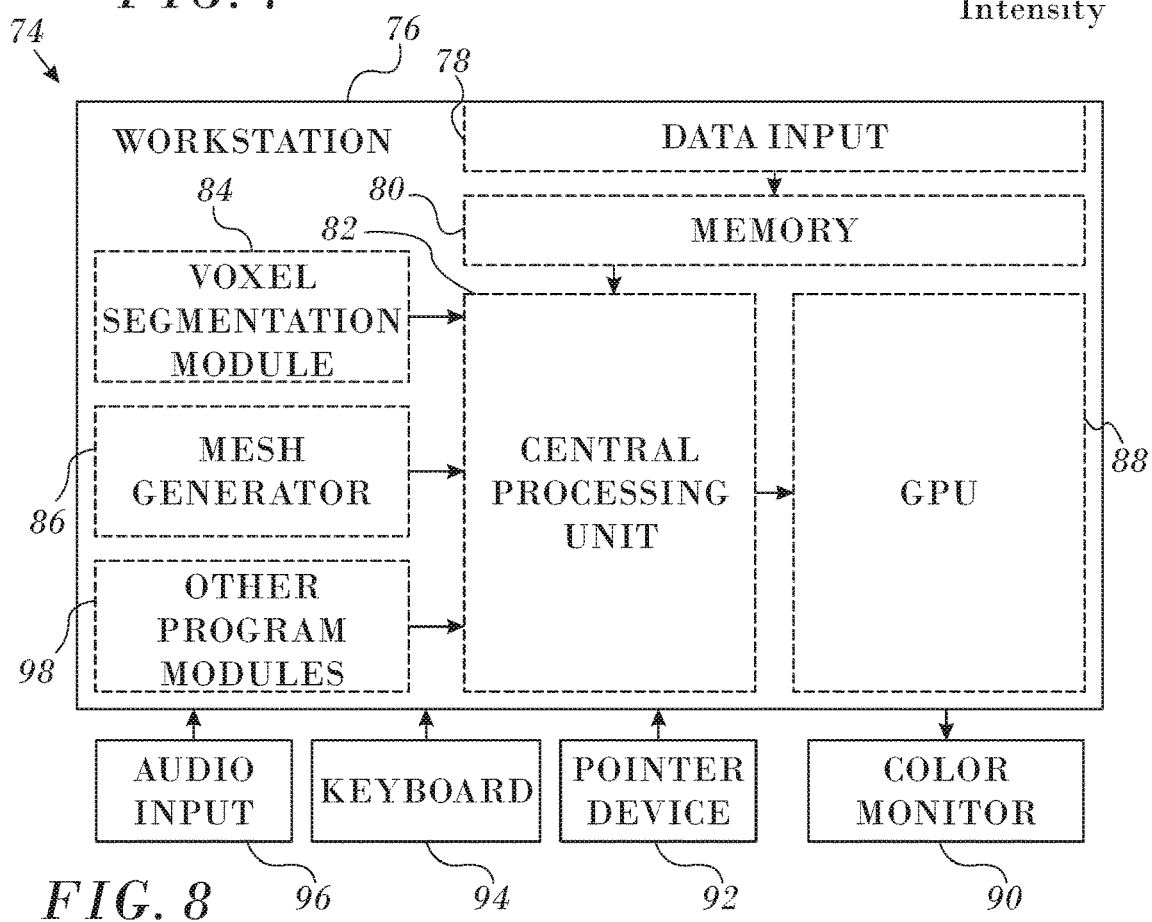
FIG. 8 is a block diagram of a computing system adapted to carry out graphics processing in accordance with an embodiment of the invention.

Reference is now made to FIG. 8, which is a block diagram of a computing system 74 adapted to carry out the procedures described above in accordance with an embodiment of the invention. The system 74 typically comprises a workstation 76 that includes general purpose or embedded computer processor, which is programmed with suitable software for carrying out the functions described hereinbelow. Thus, although portions of the system 74 are shown as comprising a number of separate functional blocks, these blocks are not necessarily separate physical entities, but rather may represent, for example, different computing tasks or data objects stored in a memory that is accessible to the processor. These tasks may be carried out in software running on a single processor, or on multiple processors. The software may be provided to the processor or processors on tangible non-transitory media, such as CD-ROM or non-volatile memory. Alternatively or additionally, the system 74 may comprise a digital signal processor, field programmable gate array or hard-wired logic.

A data input interface 78 accepts data files of such as DICOM files for storage in a data memory 80. Central processing unit 82, which may be a multiprocessor, executes program modules, including a voxel segmentation module 84 and a mesh generator 86. Typically the central processing unit 82 offloads data from the mesh generator 86 to a graphics engine 88, which can be a GPU. The graphics engine 88 renders the graphics to a display monitor 90, and is responsible for graphic operations, such as object orientation, rotation, coloring, shading and texturing. For operator interaction the workstation 76 is provided with a pointer device 92, keyboard 94, and may accept vocal commands through audio input device 96. The vocal commands may be processed by other modules 98 using speech recognition methods known in the art.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

Computer Program Listings

Listing 1

```
Shader "Volume Renderer/RayMarching"
{
Properties
{
    _AlphaCutoff("Alpha Cutoff", Range(0,1)) = 0.1
}
SubShader
{
    Tags {"RenderType"="Opaque" "LightMode" = "ForwardBase" }
    LOD 100
    Pass
{
CGPROGRAM
#pragma vertex VertShader
#pragma fragment FragShader
#pragma target 5.0
#include "UnityCG.cginc"
#include "UnityLightingCommon.cginc"
struct AppData
{
float4 vertex: POSITION;
};
struct V2F
{
float4 vertex: SV_POSITION;
float4 origPos: ORIG_POS;
};
Texture3D<float> _MainTex;
Texture3D _NormTex;
SamplerState sampler_MainTex;
float _AlphaCutoff;
fixed4 _TissueColors[20];
float2 _TissueRanges[20];
uint _TissueCount;
float Random(float2 co) {
    return frac(sin(dot(co, float2(12.9898, 78.233))) * 43758.5453);
}
bool CalcBoxIntersection(float3 rayOrigin, float3 rayDir, out float t0, out float t1)
    const float3 boxMin = float3(-0.5, -0.5, -0.5);
    const float3 boxMax = float3(0.5, 0.5, 0.5);
    float3 invR =1.0 / rayDir;
```

-continued

Listing 1

```
{
    float3 tbot = invR * (boxMin - rayOrigin);
    float3 ttop = invR * (boxMax - rayOrigin);
    float3 tmin = min(ttop, tbot);
    float3 tmax = max(ttop, tbot);
    float2 t = max(tmin.xx, tmin.yz);
    t0 = max(t.x, t.y);
    t = min(tmax.xx, tmax.yz);
    t1 = min(t.x, t.y);
    return t0 <= t1;
}
fixed4 GetColorByVal(float v, out int index)
{
    index = -1;
    for (uint i = 0; i < _TissueCount; i++)
    {
    if (v > _TissueRanges[i].x && v < _TissueRanges[i].y)
        {
        index = i;
            return _TissueColors[i];
        }
    }
    return 0;
}
V2F VertShader(AppData v)
    {
        V2F o;
        o.origPos = v.vertex;
        o.vertex = UnityObjectToClipPos(v.vertex);
        return o;
    }
    [earlydepthstencil]
    fixed4 FragShader(V2F i): SV_Target
    {
    const float3 halfP = float3(0.5, 0.5, 0.5);
    float3 viewDir = -normalize(ObjSpaceViewDir(i.origPos));
    float3 lightDir = -normalize(ObjSpaceLightDir(i.origPos));
    float3 halfDir = normalize(lightDir + viewDir);
    float rnd = Random(i.vertex.xy);
    const float step = 0.001f;
    float3 rayPos = i.origPos.xyz;
    fixed4 c = fixed4(0,0,0,1);
    int lasTissueIndex = -1;
    float t0, t1;
    if (!CalcBoxIntersection(rayPos, viewDir, t0, t1))
    {
        discard;
        return 0;
    }
    //Ray marching loop
    [loop]
    for (float k = -0.01f + rnd * 0.001f; k < t1 && c.a > 0.1; k+= step)
    {
        rayPos = i.origPos.xyz + k * viewDir;
        float3 rawObjNormal =
        _NormTex.SampleLevel(sampler_MainTex, rayPos + halfP, 0).rgb;
        float3 objNormal = normalize(rawObjNormal);
        float normLightDot = max(0, dot (objNormal, lightDir));
        float val = _MainTex.SampleLevel(sampler_MainTex, rayPos + halfP, 0);
        int tissueIndex;
        fixed4 curColor = GetColorByVal(val, tissueIndex);
        if (lasTissueIndex == tissueIndex || length(curColor) < 0.0001)
            continue;
        //Light
        lasTissueIndex = tissueIndex;
        half3 diffuseFactor = normLightDot * _LightColor0.xyz;
        half3 specularFactor = pow(saturate(dot(objNormal, halfDir)), 80);
        //Alpha
        curColor.rgb = (unity_AmbientSky.rgb * 0.3 +
            curColor.rgb * diffuseFactor + specularFactor *
            0.5) * curColor.a;
```

Listing 1

```
        c.rgb = c.rgb + c.a * curColor.rgb;
        c.a = c.a * (1.f - curColor.a);
    }
    c.a = 1 - c.a;
    if (c.a < _AlphaCutoff)
    {
        discard;
    }
    return c;
    }
    ENDCG
        }
      }
}
```

The invention claimed is:

1. A method of image processing, comprising the steps of:
accepting an array of voxels, the voxels comprising data representing a physical property of a 3-dimensional object;
segmenting the array of voxels into a plurality of regional subarrays of voxels that respectively satisfy predetermined criteria, the subarrays having outer voxels;
transforming regional the subarrays into respective triangular meshes, the meshes having triangles that surround the subarrays and intercept the outer voxels of the subarrays; and
rendering only the triangular meshes on a display in a sequence of rotational views.

2. The method according to claim 1, wherein segmenting the array of voxels is performed by ray marching.

3. The method according to claim 1, wherein transforming the subarrays is performed by executing a marching cubes algorithm on the subarrays.

4. The method according to claim 1, wherein constructing triangular meshes is performed by executing a ball pivoting algorithm.

5. The method according to claim 1, wherein transforming the subarrays is performed by executing a Delaunay triangulation algorithm.

6. The method according to claim 1, wherein rendering the triangular meshes comprises assigning respective optical characteristics to the subarrays and rendering a composite of the optical characteristics on the display.

7. The method according to claim 6, wherein the optical characteristics are pseudocolors.

8. An image-processing apparatus, comprising:
processor;
a display;
a data input interface;
a graphics processing unit;
a memory accessible to the processor storing program modules and data objects therein, wherein execution of the program modules cause the processor to perform the steps of:
accepting via the data input interface an array of voxels, the voxels comprising data representing a physical property of a 3-dimensional object;
segmenting the array of voxels into a plurality of regional subarrays of voxels that respectively satisfy predetermined criteria, the subarrays having outer voxels;
transforming the regional subarrays of voxels into respective triangular meshes, the meshes having triangles that surround the subarrays and intercept the outer voxels of the subarrays; and
with the graphics processing unit rendering only the triangular meshes on the display in a sequence of rotational views.

9. The apparatus according to claim 8, wherein segmenting the array of voxels is performed by ray marching.

10. The apparatus according to claim 8, wherein transforming the subarrays is performed by executing a marching cubes algorithm on the subarrays.

11. The apparatus according to claim 8, wherein transforming the subarrays is performed by executing a ball pivoting algorithm.

12. The apparatus according to claim 8, wherein transforming the subarrays is performed by executing a Delaunay triangulation algorithm.

13. The apparatus according to claim 8, wherein rendering the triangular meshes comprises assigning respective optical characteristics to the subarrays and rendering a composite of the optical characteristics on the display.

14. The apparatus according to claim 13, wherein the optical characteristics are pseudocolors.

* * * * *